United States Patent
Chen et al.

(10) Patent No.: US 8,515,129 B2
(45) Date of Patent: Aug. 20, 2013

(54) DISPLACEMENT DETECTION APPARATUS AND METHOD

(75) Inventors: Hsin Chia Chen, Science—Based Industrial Park Hsin-Chu (TW); Chun Wei Chen, Science—Based Industrial Park Hsin-Chu (TW)

(73) Assignee: Pixart Imaging Inc., Hsin-Chu County (TW)

( * ) Notice: Subject to any disclaimer, the term of this patent is extended or adjusted under 35 U.S.C. 154(b) by 331 days.

(21) Appl. No.: 12/956,993

(22) Filed: Nov. 30, 2010

(65) Prior Publication Data

US 2011/0150363 A1    Jun. 23, 2011

(30) Foreign Application Priority Data

Dec. 18, 2009 (TW) ............................... 98143527 A

(51) Int. Cl.
*G06K 9/00* (2006.01)
(52) U.S. Cl.
USPC .......................................... 382/103; 382/100
(58) Field of Classification Search
None
See application file for complete search history.

(56) References Cited

U.S. PATENT DOCUMENTS

| | | | | |
|---|---|---|---|---|
| 5,898,170 A * | 4/1999 | Featherston et al. | ..... | 250/231.18 |
| 5,917,958 A * | 6/1999 | Nunally et al. | ...... | 382/276 |
| 6,363,160 B1 * | 3/2002 | Bradski et al. | ........ | 382/103 |
| 6,380,986 B1 * | 4/2002 | Minami et al. | ........ | 348/699 |
| 6,664,948 B2 * | 12/2003 | Crane et al. | ........ | 345/166 |
| 7,167,161 B2 | 1/2007 | Ahn | | |
| 8,013,841 B2 * | 9/2011 | Bieber et al. | ........ | 345/166 |
| 8,264,462 B2 * | 9/2012 | Mellot | ........ | 345/166 |
| 8,300,888 B2 * | 10/2012 | Chang et al. | ........ | 382/103 |
| 2003/0058218 A1 * | 3/2003 | Crane et al. | ........ | 345/158 |
| 2004/0017355 A1 * | 1/2004 | Shim | ........ | 345/157 |
| 2005/0110746 A1 * | 5/2005 | Hou | ........ | 345/156 |
| 2006/0164393 A1 * | 7/2006 | Wu et al. | ........ | 345/163 |
| 2006/0197664 A1 * | 9/2006 | Zhang et al. | ........ | 340/555 |
| 2008/0031513 A1 * | 2/2008 | Hart | ........ | 382/154 |
| 2008/0232645 A1 * | 9/2008 | Billinghurst et al. | ........ | 382/103 |
| 2008/0316174 A1 * | 12/2008 | Mellot | ........ | 345/166 |
| 2009/0195505 A1 * | 8/2009 | Chen et al. | ........ | 345/166 |
| 2010/0088652 A1 * | 4/2010 | Ramsay et al. | ........ | 715/857 |
| 2011/0032185 A1 * | 2/2011 | Yamamoto et al. | ........ | 345/157 |
| 2011/0150363 A1 * | 6/2011 | Chen et al. | ........ | 382/291 |

FOREIGN PATENT DOCUMENTS

| | | |
|---|---|---|
| CN | 1801060 A | 7/2006 |
| CN | 101561720 A | 10/2009 |

* cited by examiner

*Primary Examiner* — Jason M Repko
*Assistant Examiner* — Avinash J Yentrapati
(74) *Attorney, Agent, or Firm* — Lowe, Hauptman & Ham

(57) ABSTRACT

A displacement detection method includes the steps of: capturing a first frame and a second frame; selecting a first block with a predetermined size in the first frame and selecting a second block with the predetermined size in the second frame; determining a displacement according to the first block and the second block; comparing the displacement with at least one threshold; and adjusting the predetermined size according to a comparison result of comparing the displacement and the threshold. The present invention further provides a displacement detection apparatus.

17 Claims, 5 Drawing Sheets

DISPLACEMENT DETECTION APPARATUS AND METHOD

CROSS REFERENCE TO RELATED APPLICATION

This application claims the priority benefit of Taiwan Patent Application Serial Number 098143527, filed on Dec. 18, 2009, the full disclosure of which is incorporated herein by reference.

BACKGROUND

1. Field of the Invention

This invention generally relates to a displacement detection apparatus and method and, more particularly, to a displacement detection apparatus and method that can adaptively adjust the size of comparison blocks.

2. Description of the Related Art

A conventional optical mouse continuously captures images of a working surface with an image sensor and compares the correlation between a reference frame and a current frame sensed by the sensor array of the image sensor in a sampling period to calculate a displacement. After the displacement is obtained, the current frame is updated to a new reference frame and the correlation between the updated reference frame and a newly captured current frame will be compared in the next sampling period so as to obtain a next displacement. However, the aforementioned displacement detection method has the problem of being unable to detect small displacement and low detection accuracy.

Please refer to FIG. 1, it shows a displacement detection method capable of detecting small displacement and disclosed in U.S. Pat. No. 7,167,161. In a first sampling period, an image sensor captures a first current frame 92 to be stored in a storage unit. In the meanwhile, a reference frame 91 has been stored in the storage unit, wherein the reference frame 91 is an image frame captured by the image sensor in a sampling period previous to the first sampling period. A first reference block 91$a$ is set for comparing the correlation. Next, a processing unit sequentially searches the first current frame 92 from the top left to the right bottom to find the position of a first search block 92$a$ having the highest correlation with the first reference block 91$a$, and then calculates a position difference therebetween. For example in FIG. 1, the position difference between the first search block 92$a$ in the first current frame 92 and the first reference block 91$a$ in the reference frame 91 is three pixels upward. In a second sampling period, the image sensor captures a second current frame 93 to be stored in the storage unit. At this moment, only the reference block is updated and the reference frame is not, wherein the second reference block 91$b$ is obtained from shifting the first reference block 91$a$ three pixels downward and it is in the reverse direction of the position difference obtained in the first sampling period. Then, the processing unit sequentially searches the second current frame 93 from the top left to the right bottom to find the position of a second search block 93$a$ having the highest correlation with the second reference block 91$b$, and then calculates a position difference therebetween. In this conventional displacement detection method, an accumulation of small displacement can be detected so as to detect small angle movement by updating the position of reference block rather than updating the reference frame according to the position difference obtained in a previous sampling period.

The present invention further provides a displacement detection apparatus and method that has higher stability and can utilize the sensor array with a smaller size.

SUMMARY

The present disclosure provides a displacement detection apparatus and displacement detection method that can utilize the sensor array with a smaller size so as to reduce the total cost.

The present disclosure further provides a displacement detection apparatus and displacement detection method that has the efficacy of improving the detection stability and inch per second simultaneously by means of real-timely adjusting the size of comparison blocks.

The present disclosure provides a displacement detection method including the steps of: capturing a first frame and a second frame; selecting a first block with a predetermined size in the first frame and a second block with the predetermined size in the second frame; determining a displacement according to the first block and the second block; comparing the displacement with at least one threshold; and adjusting the predetermined size according to a comparison result of comparing the displacement and the threshold.

The present disclosure further provides a displacement detection method including the steps of: capturing a first frame and a second frame; comparing an area with a predetermined size of the first frame with an area with the predetermined size of the second frame; determining a displacement according to a comparison result; decreasing the predetermined size when the displacement is larger than an upper threshold; and increasing the predetermined size when the displacement is smaller than a lower threshold.

The present disclosure further provides a displacement detection apparatus including an image sensing unit, a storage unit and a processing unit. The image sensing unit is configured to capture a first frame and a second frame. The storage unit is configured to store at least one threshold. The processing unit is configured to select a first block with a predetermined size in the first frame and select a second block with the predetermined size in the second frame, determine a displacement according to the first block and the second block, compare the displacement with at least one threshold, and adjust the predetermined size according to a comparison result of comparing the displacement and the threshold.

In the displacement detection apparatus and method of the present disclosure, the displacement is obtained according to the correlation between an area with the predetermined size in the first frame and the second frame, wherein the displacement may be a sum of the absolute value of a displacement in a first direction and the absolute value of a displacement in a second direction perpendicular to the first direction, or a sum of square of a displacement in the first direction and a displacement in the second direction. The displacement detection apparatus of the present disclosure may be an optical mouse.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noticed that, wherever possible, the same reference numbers will be used throughout the drawings to refer to the same or like parts.

Figure 1:
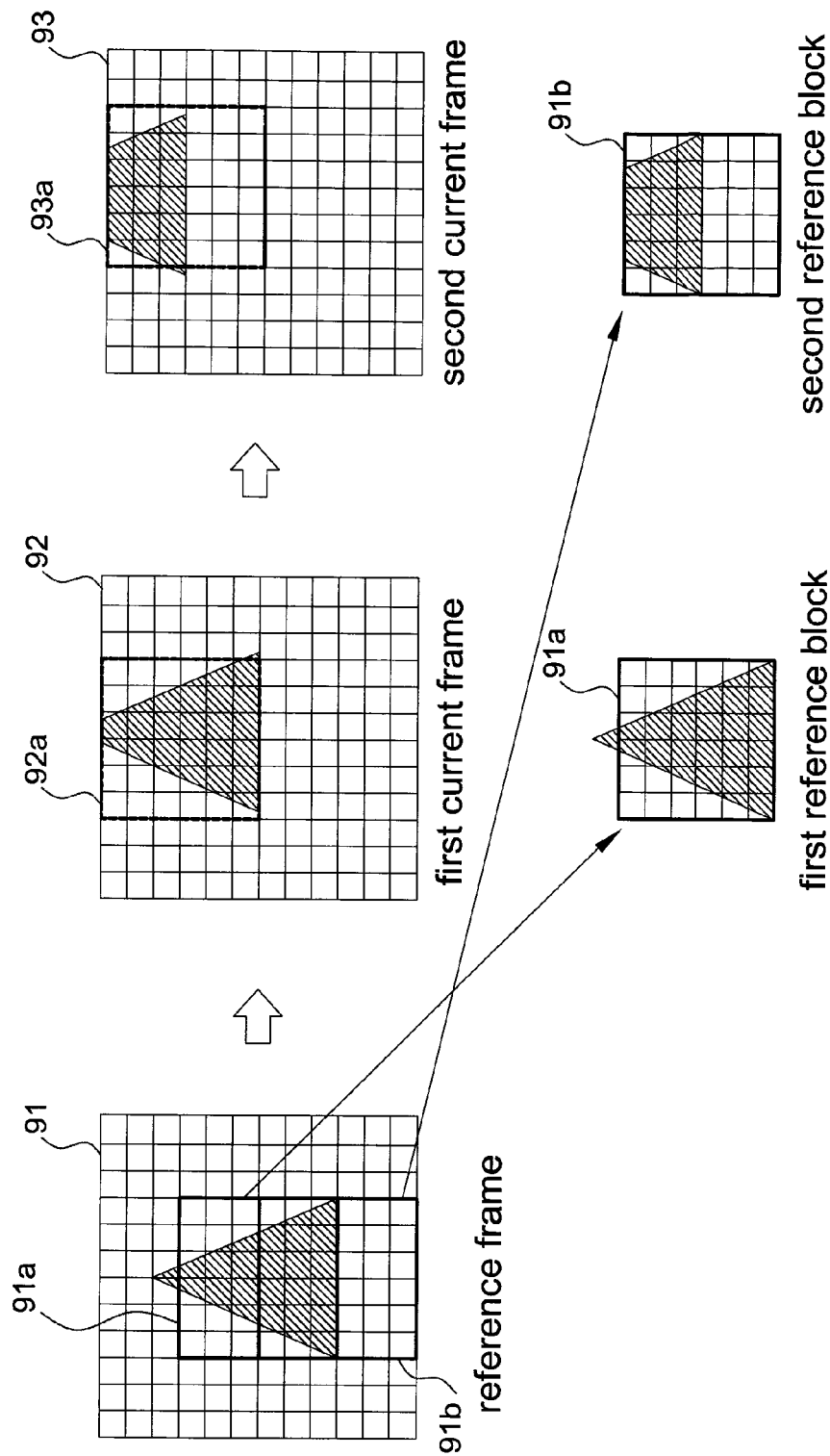
FIG. 1 shows a schematic diagram of a conventional displacement detection method.
Figure 2A:
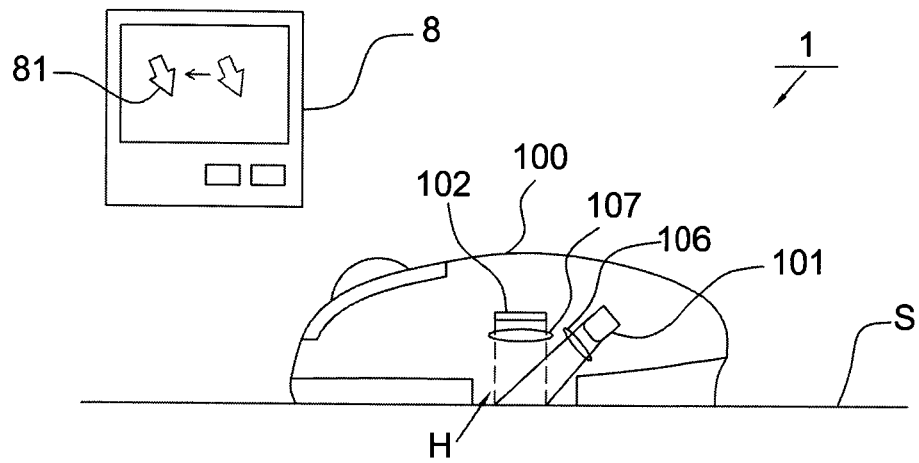
FIG. 2a shows a schematic diagram of the displacement detection apparatus according to the first embodiment of the present invention and a corresponding image display thereof.
Figure 2B:
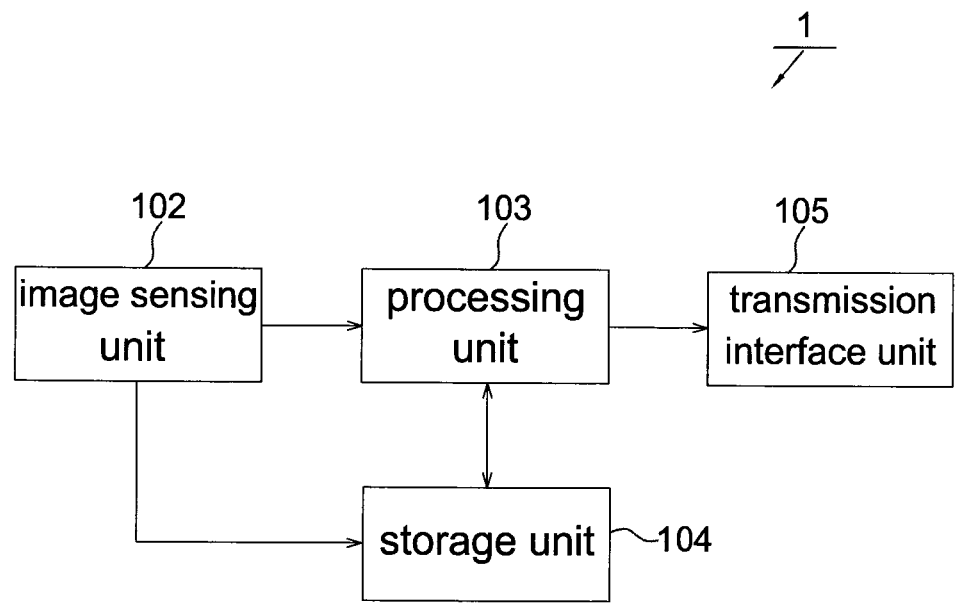
FIG. 2b shows a block diagram of the displacement detection apparatus according to the first embodiment of the present invention.

Please refer to FIGS. 2a and 2b, they respectively show a schematic diagram and a block diagram of the displacement detection apparatus according to the first embodiment of the present invention. In this embodiment, the displacement detection apparatus 1 is shown as an optical mouse, but the present invention is not limited to this. The displacement detection apparatus 1 is generally placed on a working surface S, such that a user may control the operation of an image display 8 by controlling the displacement detection apparatus 1, such as controlling the motion of a cursor 81 shown on the image display 8 or the operation of a software. The image display may be a television screen, a computer screen, a projector screen, a game machine screen or other devices for displaying image.

The displacement detection apparatus 1 includes a case 100 for being operated by a user, and an opening H is formed on the bottom surface of the case 100. Components used to detect the displacement of the displacement detection apparatus 1 with respect to the working surface S are disposed inside the case 100. The displacement detection apparatus 1 includes a light source 101, an image sensing unit 102, a processing unit 103, a storage unit 104 and a transmission interface unit 105. In addition, the displacement detection apparatus 1 may further includes a lens 106 (or lens set) disposed in front of the light-emitting surface of the light source 101 to adjust the illumination range of the light source 101. The displacement detection apparatus 1 may further include another lens 107 (or lens set) disposed in front of the sensor array of the image sensing unit 102 to adjust the sensing efficiency thereof.

Embodiments of the light source 101 include, but not limited to, a light emitting diode or a laser diode, and preferably the light source 101 may be an infrared light emitting diode or an infrared laser diode, but the light source 101 in the present invention is not limited to infrared light sources. The light source 101 is configured to illuminate the working surface S outside the opening H to let the image sensing unit 102 can capture images with sufficient brightness. It can be understood that if the displacement detection apparatus 1 is not an optical mouse, the light source may not be implemented.

Embodiments of the image sensing unit 102 include, but not limited to, a CCD image sensor and a CMOS image sensor, which has a sensor array to sense optical images of the working surface S outside the opening H within a sampling period, and converts the captured optical images to digital image frames to be transmitted to the processing unit 103 for processing. For example if the image sensing unit 102 captures 3,000 frames per second, the sampling period is $1/3,000$ second.

The processing unit 103 may be, for example, a digital signal processor (DSP) that is configured to select a search block in a current frame captured by the image sensing unit 102 and to select a reference block in a reference frame stored in the storage unit 104, and then compare the correlation between the reference block and the search block to calculate a displacement of the displacement detection apparatus 1 with respect to the working surface S between two sampling periods; wherein the reference frame is a frame captured by the image sensing unit 102 in a sampling period previous to the sampling period capturing the current frame. In the meanwhile, the processing unit 103 also dynamically adjusts the size of comparison blocks according to the displacement obtained. The comparison blocks include the reference block and the search block herein, wherein details of calculating the displacement and dynamically adjusting the size of comparison blocks will be described hereinafter. It is appreciated that the current frame captured by the image sensing unit 102 may be directly transmitted to the processing unit 103 for comparison, or be stored in the storage unit 104 first and then read out from the storage unit 104 by the processing unit 103 for comparison.

The storage unit 104 is configured to store the reference frame and the current frame captured by the image sensing unit 102, and further to store at least one threshold or a look-up table composed of a plurality of thresholds. The processing unit 103 then compares the threshold with the displacement calculated in every sampling period to realtimely adjust the size of comparison blocks, or determines the size of comparison blocks to be adjusted according to the look-up table. In addition, when the current frame is updated to the reference frame, the updated reference frame is also stored in the storage unit 104.

The transmission interface unit 105 is configured to wirelessly or electrically transmit the displacement obtained by the processing unit 103 and other control signals to the image display 8, wherein the signal transmission method is well know to the art and details will not be described herein.

Figure 3:
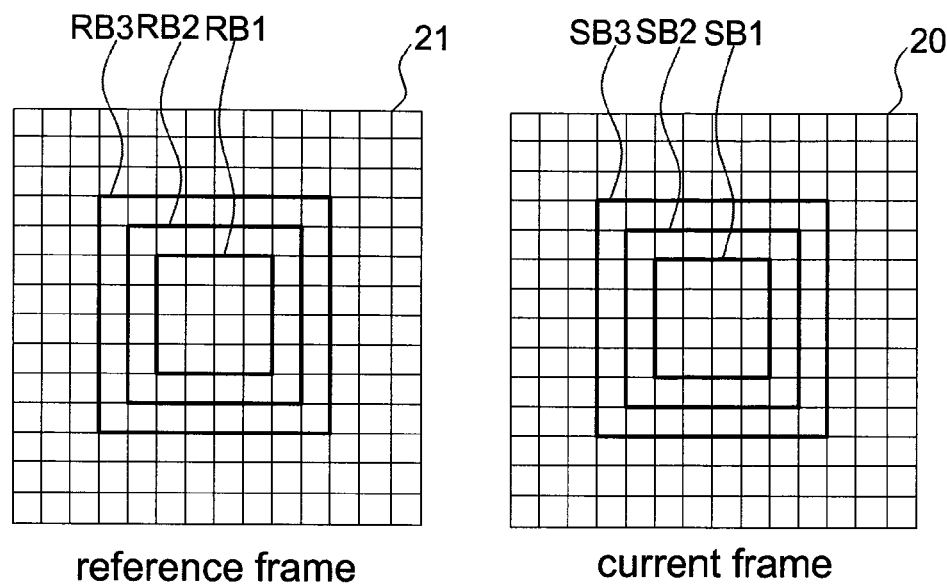
FIG. 3 shows a schematic diagram of the displacement detection method according to the embodiment of the present invention.

Please reference to FIG. 3, it shows a schematic diagram of the displacement detection method according to the embodiment of the present invention. In each sampling period, the image sensing unit 102 captures a current frame 20 and transmits it to the processing unit 103 or stores it in the storage unit 104. At this moment, a reference frame 21, which is captured by the image sensing unit 102 in a previous sampling period, is already stored in the storage unit 104. The processing unit 103 selects a reference block with a predetermined size in the reference frame 21, such as the 6×6 reference block RB2 at the center of the reference frame 21 as a comparison object. The processing unit 103 then sequentially searches the whole current frame 20 with a 6×6 search block SB2 so as to obtain an optimum search block SB2 that has the highest correlation with the reference block RB2, wherein the search sequence may be, for example, from one corner of the current frame 20 to the opposite corner. Then, the processing unit 103 calculates a position difference between a corresponding position of the reference block RB2 in the current frame 20 and the optimum search block SB2 to be served as the displacement of the displacement detection apparatus 1. And then the processing unit 103 compares the calculated displacement with at least one threshold or a look-up table to obtain a size of the comparison blocks used in the next sampling period. For example, if the detected displacement is lower than a lower threshold, larger comparison blocks may be used, such as the comparison blocks SB3 and RB3 with a size of 8×8; Otherwise, if the detected displacement is higher than an upper threshold, smaller comparison blocks may be used, such as the comparison blocks SB1 and RB1 with a size of 4×4, wherein the lower threshold is lower than the upper threshold. Although the size of the current frame 20 and the reference frame 21 is shown as 14×14 in this embodiment, it is only an example rather than a limitation of the present invention.

Generally speaking, the displacement detection apparatus 1 requires a higher detection linearity and stability under low speed moving and needs to be able to detect higher inch per second under high speed moving. If the comparison blocks have a larger size, higher detection linearity and stability can be obtained. On the contrary, if the comparison blocks have a smaller size, inch per second is higher. Therefore, the present invention determines the size of comparison blocks according to the detected displacement so as to increase the detection effectiveness under both high speed and low speed moving.

Figure 4A:
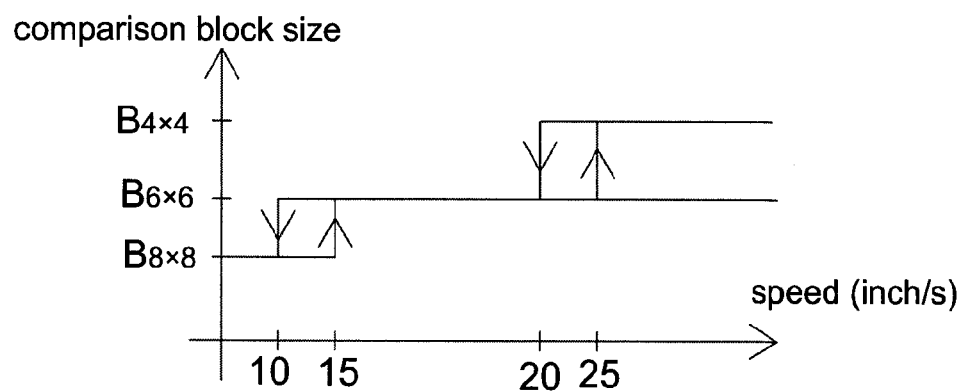
FIG. 4a shows a schematic diagram of the threshold setting in the displacement detection method according to the embodiment of the present invention.
Figure 4B:
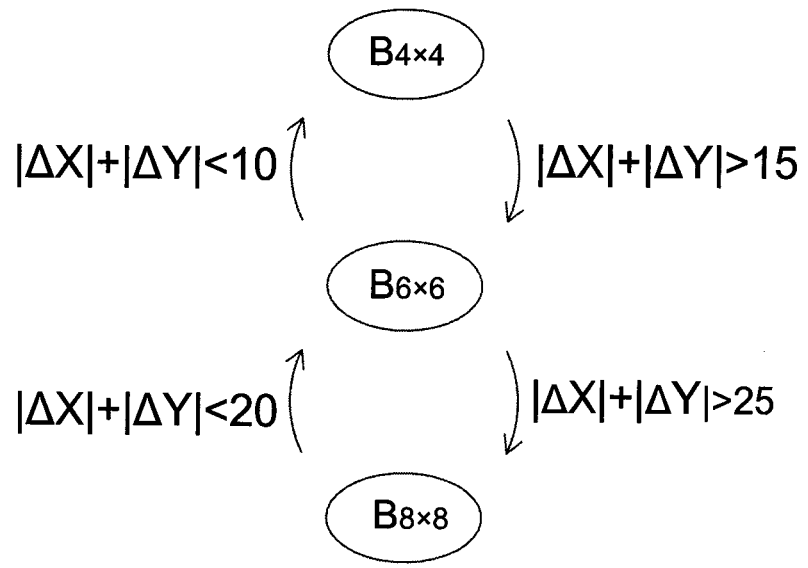
FIG. 4b shows another schematic diagram of the threshold setting in the displacement detection method according to the embodiment of the present invention.
Figure 4C:
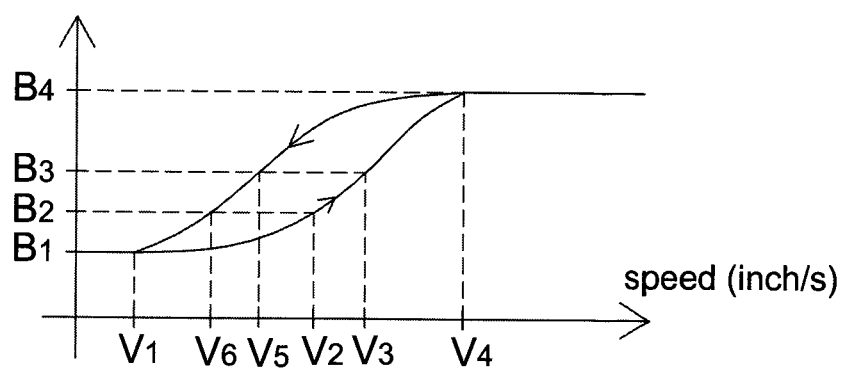
FIG. 4c shows a further schematic diagram of the threshold setting in the displacement detection method according to the embodiment of the present invention.

Please refer to FIGS. 4a to 4c, they show schematic diagrams of the threshold setting in the displacement detection method of the present invention. In the present invention, the threshold is determined according to inch per second (IPS) associated with different sizes of the comparison blocks. In one embodiment, it is assumed that the size of the current frame 20 and the reference frame 21 is 14×14 and a pixel area of the sensor array of the image sensing unit 102 is 30 $\mu m^2$. Therefore, the IPS is equal to $(14-8) \times 30 \times 10^{-3} \times 3,000/25.4 = 21$ when the size of comparison blocks is 8×8; the IPS is equal to $(14-6) \times 30 \times 10^{-3} \times 3,000/25.4 = 28$ when the size of comparison blocks is 6×6; and the IPS is equal to $(14-4) \times 30 \times 10^{-3} \times 3,000/25.4 = 35$ when the size of comparison blocks is 4×4. In the threshold setting above, the processing unit 103 adjusts the size of comparison blocks once a second, but the adjustment period is not limited to once a second. The adjustment period may be larger or smaller than one second and the threshold may also be different according to different adjustment periods.

For example in FIG. 4a, it is assumed that in the displacement detection method of the present invention the processing unit 103 may select one of three sizes of the comparison blocks to perform displacement detection, and the threshold is preferably lower than the IPS detectable by every size of the comparison blocks. For example in the present embodiment, a first upper threshold is set as 15 IPS, a second upper threshold is set as 25 IPS, a first lower threshold is set as 10 IPS and a second lower threshold is set as 20 IPS, wherein values of the upper thresholds and lower thresholds is set different to avoid the oscillation of the size of comparison blocks between two values when a displacement detected by the displacement detection apparatus 1 is close to the set threshold However, the upper and lower thresholds may be identical values.

According to FIG. 4a, if an initial size of comparison blocks is set as 6×6 and when the movement in a second detected by the processing unit 103 is larger than 25 IPS, the size of comparison blocks will be adjusted to 4×4 in the next sampling period. When the movement in a second detected by the processing unit 103 is smaller than 10 IPS, the size of comparison blocks will be adjusted to 8×8 in the next sampling period. Otherwise, the size of comparison blocks will be maintained as 6×6. Similarly, when the initial size of comparison blocks is 4×4 or 8×8, the processing unit 103 will adjust the size of comparison blocks used in the next sampling period according to the relation between the threshold and the detected movement in a second. It is appreciated that the values of the threshold shown herein are only examples rather than limitations of the present invention.

FIG. 4b shows another schematic diagram of the threshold setting in the displacement detection method of the present invention, wherein the displacement calculated by the processing unit 103 may be further divided as a displacement in the X direction $\Delta X$ and a displacement in the Y direction $\Delta Y$, wherein the X direction is perpendicular to the Y direction. The processing unit 103 may compare a sum of the absolute value of $\Delta X$ and the absolute value of $\Delta Y$, a sum of square of $\Delta X$ and $\Delta Y$, or any one of $\Delta X$ and $\Delta Y$ with the threshold, and determines the size of comparison blocks used in the next sampling period according to a comparison result. For example, FIG. 4b shows a method comparing a sum of the absolute value of a displacement in the X direction $\Delta X$ and the absolute value of a displacement in the Y direction $\Delta Y$ with the threshold. In addition, the representation of the displacement is not limited to that described herein, and other representations are also applicable to the displacement detection method of the present invention, such as a square root of a sum of squares of a displacement in the X direction $\Delta X$ and a displacement in the Y direction $\Delta Y$.

Please refer to FIG. 4c, it shows another schematic diagram of the threshold setting according to the embodiment of the present invention, wherein the relation of the movement in a second calculated by the processing unit 103 and the threshold is set as following: when the moving speed detected increases gradually and when the moving speed exceeds a first speed V1, the size of comparison blocks is selected as B1; and when the moving speed exceeds a second speed V2, the size of comparison blocks is selected as B2; and when the moving speed exceeds a third speed V3, the size of comparison blocks is selected as B3; and when the moving speed exceeds a fourth speed V4, the size of comparison blocks is selected as B4. On the contrary, when the moving speed detected decreases gradually and when the moving speed is lower than a fifth speed V5, the size of comparison blocks is selected as B3; and when the moving speed is lower than a sixth speed V6, the size of comparison blocks is selected as B2. In addition, a plurality of thresholds and corresponding sizes of the comparison blocks may be formed as a look-up table in the present invention. The processing unit 103 may select a proper size of the comparison blocks according to the look-up table.

Figure 5A:
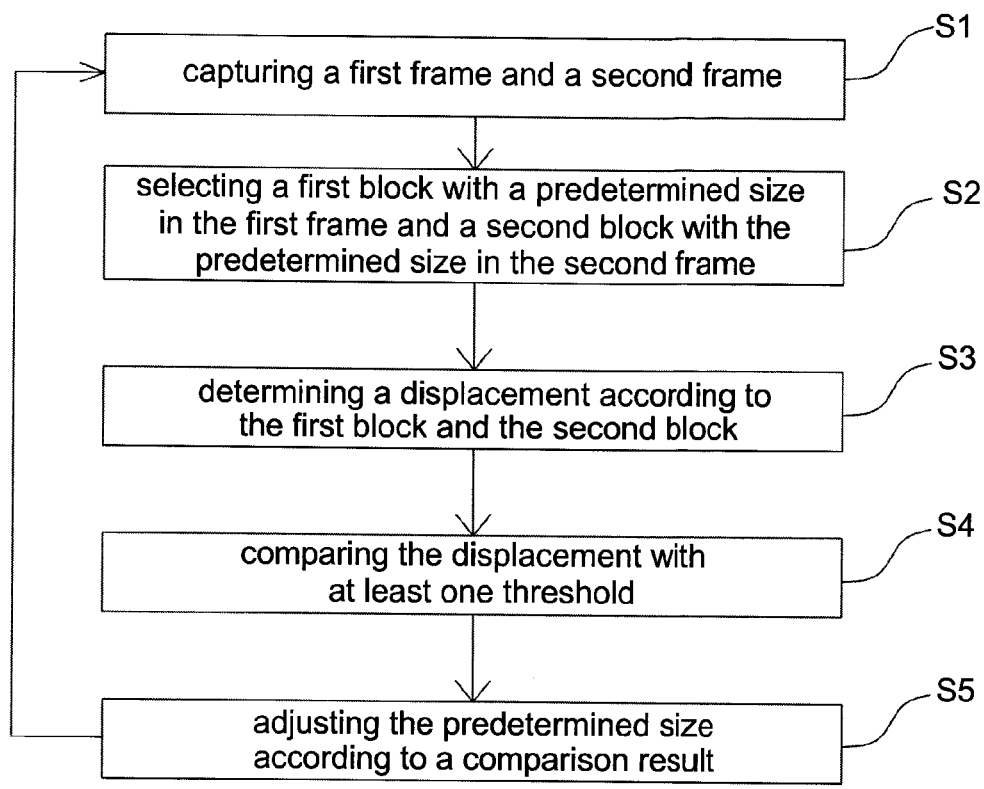
FIG. 5a shows a flow chart of the displacement detection method according to an embodiment of the present invention.

Please refer to FIG. 5a, it shows a flow chart of the displacement detection method according to an embodiment of the present invention, which includes the steps of: capturing a first frame and a second frame (Step S1); selecting a first block with a predetermined size in the first frame and a second block with the predetermined size in the second frame (Step S2); determining a displacement according to the first block and the second block (Step S3); comparing the displacement with at least one threshold (Step S4); and adjusting the predetermined size according to a comparison result of comparing the displacement and the threshold (Step S5).

Figure 5B:
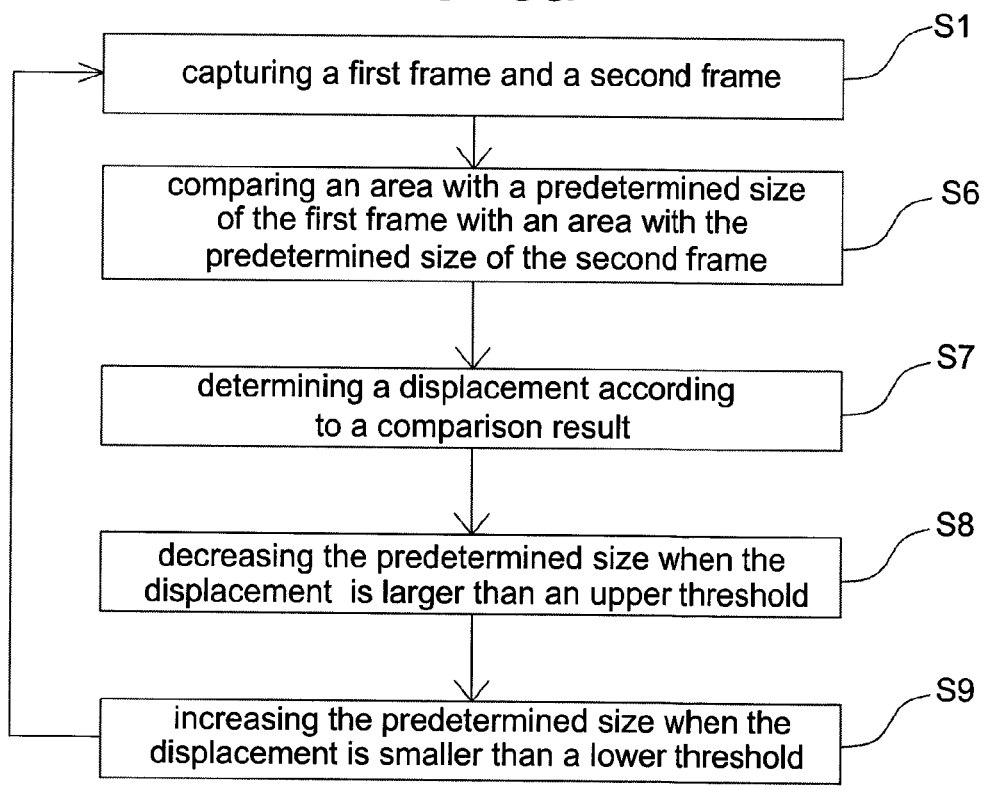
FIG. 5b shows a flow chart of the displacement detection method according to another embodiment of the present invention.

Please refer to FIG. 5b, it shows a flow chart of the displacement detection method according to another embodiment of the present invention, which includes the steps of: capturing a first frame and a second frame (Step S1); comparing an area with a predetermined size of the first frame with an area with the predetermined size of the second frame (Step S6); determining a displacement according to a comparison result (Step S7); decreasing the predetermined size when the displacement is larger than an upper threshold (Step S8); increasing the predetermined size when the displacement is smaller than a lower threshold (Step S9).

It is appreciated that the displacement detection method of the present invention is not limited to the embodiments shown in the present invention, and it can be adapted to other cursor control apparatuses and pointer control apparatuses. That is, the displacement detection method of the present invention can be applied to any detection apparatus that can control a cursor movement or the operation of a software by detecting a relative displacement between the detection apparatus and a reference object.

A displacement detection apparatus that utilizes the displacement detection method of the present invention can use smaller sensor array to achieve identical detection efficiency. For example, if a 16×16 sensor array and 8×8 comparison blocks are used in a conventional detection apparatus, a 14×14 sensor array and 8×8, 6×6, or 4×4 comparison blocks can be used in the present invention to achieve identical displacement detection efficiency.

As mentioned above, because conventional displacement detection apparatuses have disadvantages of unable to identify small displacement and insufficient accuracy, the present invention further provides a displacement detection apparatus (FIGS. 2a, 2b and 6) and a displacement detection method (FIGS. 5a and 5b) that can adjust the size of comparison blocks adaptively, and increase the displacement detection stability and detectable maximum speed (inch per second). Furthermore, the present invention can use smaller sensor array to reduce the total cost.

Although the invention has been explained in relation to its preferred embodiment, the present invention is not limited to this. It is to be understood that many other possible modifications and variations can be made by those skilled in the art without departing from the spirit and scope of the invention as hereinafter claimed.

What is claimed is:

1. A displacement detection method, comprising:
   capturing a first frame and a second frame;
   selecting a first block in the first frame and a second block in the second frame, wherein the first and second blocks have a same size, the size of the first and second blocks is either a first size or a second size, and the second size is smaller than the first size;
   determining a displacement according to the first block and the second block;
   comparing the displacement with an upper threshold or a lower threshold, wherein the lower threshold is smaller than the upper threshold;
   for the size of the first and second blocks being the first size, adjusting the size of the first and second blocks to the second size when the displacement is larger than the upper threshold, and maintaining the size of the first and second blocks as the first size when the displacement is smaller than the upper threshold; and
   for the size of the first and second blocks being the second size, adjusting the size of the first and second blocks to the first size when the displacement is smaller than the lower threshold, and maintaining the size of the first and second blocks as the second size when the displacement is larger than the lower threshold.

2. The displacement detection method as claimed in claim 1, further comprising:
   transmitting the displacement to an image display.

3. The displacement detection method as claimed in claim 1, wherein the displacement is
   a sum of an absolute value of a displacement in a first direction and an absolute value of a displacement in a second direction perpendicular to the first direction, or
   a sum of squares of the displacement in the first direction and the displacement in the second direction.

4. The displacement detection method as claimed in claim 1, wherein the determining includes:
   searching for the second block having the highest correlation with the first block in the second frame; and
   calculating a position difference between a corresponding position of the first block in the second frame and a position of the second block as the displacement.

5. The displacement detection method as claimed in claim 1, wherein the displacement is a movement in a second.

6. The displacement detection method as claimed in claim 1, wherein the first size, the second size, the upper threshold and the lower threshold are formed as a look-up table.

7. A displacement detection method, comprising:
   capturing a first frame and a second frame;
   comparing a first area of the first frame with a second area of the second frame, wherein the first and second areas have a same size, the size of the first and second areas is a first size, a second size or a third size, the second size is smaller than the first size and the third size is smaller than the second size;
   determining a displacement according to a comparison result;
   for the size of the first and second areas being the first size, adjusting the size of the first and second areas to the second size when the displacement is larger than a first upper threshold, and maintaining the size of the first and second areas as the first size when the displacement is smaller than the first upper threshold;
   for the size of the first and second areas being the second size, adjusting the size of the first and second areas to the third size when the displacement is larger than a second upper threshold, adjusting the size of the first and second areas to the first size when the displacement is smaller than a first lower threshold, and maintaining the size of the first and second areas as the second size when the displacement is smaller than the second upper threshold and larger than a second lower threshold; and
   for the size of the first and second areas being the third size, adjusting the size of the first and second areas to the second size when the displacement is smaller than the second lower threshold, and maintaining the size of the first and second areas as the third size when the displacement is larger than the second lower threshold, wherein the first lower threshold is smaller than the first upper threshold, the first upper threshold is smaller than the second lower threshold, and the second lower threshold is smaller than the second upper threshold.

8. The displacement detection method as claimed in claim 7, further comprising:
   transmitting the displacement to an image display.

9. The displacement detection method as claimed in claim 7, wherein the displacement is
   a sum of an absolute value of a displacement in a first direction and an absolute value of a displacement in a second direction perpendicular to the first direction, or
   a sum of squares of the displacement in the first direction and the displacement in the second direction.

10. The displacement detection method as claimed in claim 7, wherein the displacement is a movement in a second.

11. The displacement detection method as claimed in claim 7, wherein the comparing includes comparing correlations of the first and second areas.

12. A displacement detection apparatus, comprising:
an image sensing unit configured to capture a first frame and a second frame;
a storage unit configured to store an upper threshold and a lower threshold, wherein the lower threshold is smaller than the upper threshold; and
a processor configured to
select a first block in the first frame and select a second block in the second frame, wherein the first and second blocks have a same size, the size of the first and second blocks is either a first size or a second size, and the second size is smaller than the first size,
determine a displacement according to the first block and the second block,
compare the displacement with the upper threshold or the lower threshold,
for the size of the first and second blocks being the first size, adjust the size of the first and second blocks to the second size when the displacement is larger than the upper threshold, and maintain the size of the first and second blocks as the first size when the displacement is smaller than the upper threshold, and
for the size of the first and second blocks being the second size, adjust size of the first and second blocks the to the first size when the displacement is smaller than the lower threshold, and maintain the size of the first and second blocks as the second size when the displacement is larger than the lower threshold.

13. The displacement detection apparatus as claimed in claim 12, further comprising a light source configured to provide light to a working surface when the image sensing unit is capturing image frames.

14. The displacement detection apparatus as claimed in claim 12, further comprising a transmission interface unit configured to transmit the displacement obtained by the processor to an image display.

15. The displacement detection apparatus as claimed in claim 14, wherein the transmission interface unit is wirelessly or electrically coupled to the image display.

16. The displacement detection apparatus as claimed in claim 12, wherein the storage unit is configured to store the first frame and the second frame captured by the image sensing unit.

17. The displacement detection apparatus as claimed in claim 12, wherein the displacement detection apparatus is an optical mouse.

\* \* \* \* \*